United States Patent
Pezeshki et al.

(10) Patent No.: US 11,716,725 B2
(45) Date of Patent: Aug. 1, 2023

(54) USER EQUIPMENT REQUESTS FOR A NUMBER OF TRANSMISSION CONFIGURATION INDICATOR STATES

(71) Applicant: QUALCOMM Incorporated, San Diego, CA (US)

(72) Inventors: Hamed Pezeshki, San Diego, CA (US); Tao Luo, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 17/186,695

(22) Filed: Feb. 26, 2021

(65) Prior Publication Data
US 2021/0282125 A1  Sep. 9, 2021

Related U.S. Application Data

(60) Provisional application No. 62/986,424, filed on Mar. 6, 2020.

(51) Int. Cl.
*H04W 72/20* (2023.01)
*H04W 72/54* (2023.01)

(52) U.S. Cl.
CPC .......... *H04W 72/20* (2023.01); *H04W 72/54* (2023.01)

(58) Field of Classification Search
CPC . H04W 72/0406; H04W 72/08; H04B 7/0695
See application file for complete search history.

(56) References Cited

U.S. PATENT DOCUMENTS

| | | | |
|---|---|---|---|
| 2019/0150133 A1* | 5/2019 | Li | H04B 7/0695 375/224 |
| 2019/0296854 A1* | 9/2019 | Kubo | H04W 80/02 |
| 2020/0389883 A1* | 12/2020 | Faxér | H04L 5/0048 |
| 2020/0389884 A1* | 12/2020 | Hakola | H04B 7/0695 |
| 2021/0195493 A1* | 6/2021 | Zhang | H04W 36/30 |
| 2021/0212082 A1* | 7/2021 | Wang | H04L 5/0053 |
| 2022/0095345 A1* | 3/2022 | Chen | H04L 27/2607 |
| 2022/0174598 A1* | 6/2022 | Seo | H04W 52/0229 |

FOREIGN PATENT DOCUMENTS

WO    2019138070 A1    7/2019

OTHER PUBLICATIONS

International Search Report and Written Opinion—PCT/US2021/020297—ISA/EPO—dated Jun. 29, 2021.

* cited by examiner

*Primary Examiner* — Abdullahi Ahmed
(74) *Attorney, Agent, or Firm* — Harrity & Harrity, LLP

(57) ABSTRACT

Various aspects of the present disclosure generally relate to wireless communication. In some aspects, a user equipment (UE) may transmit a request to use a preferred number of transmission configuration indicator (TCI) states for communications with one or more base stations. The UE may receive an indication to use a number of TCI states based at least in part on the request. Numerous other aspects are described.

30 Claims, 8 Drawing Sheets

USER EQUIPMENT REQUESTS FOR A NUMBER OF TRANSMISSION CONFIGURATION INDICATOR STATES

CROSS-REFERENCE TO RELATED APPLICATION

This patent application claims priority to Provisional Patent Application No. 62/986,424, filed on Mar. 6, 2020, entitled "USER EQUIPMENT REQUESTS FOR A NUMBER OF TRANSMISSION CONFIGURATION INDICATOR STATES," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for user equipment requests for a number of transmission configuration indicator (TCI) states.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communications performed by a user equipment (UE) includes transmitting a request to use a preferred number of transmission configuration indicator (TCI) states for communications with one or more base stations; and receiving an indication to use a number of TCI states based at least in part on the request.

In some aspects, a method of wireless communications performed by a base station includes receiving, from a UE, a request to use a preferred number of TCI states; and transmitting an indication to use a number of TCI states based at least in part on the request.

In some aspects, a UE for wireless communication includes a memory; and one or more processors operatively coupled to the memory, the memory and the one or more processors configured to: transmit a request to use a preferred number of TCI states for communications with one or more base stations; and receive an indication to use a number of TCI states based at least in part on the request.

In some aspects, a base station for wireless communication includes a memory; and one or more processors operatively coupled to the memory, the memory and the one or more processors configured to: receive, from a UE, a request to use a preferred number of TCI states; and transmit an indication to use a number of TCI states based at least in part on the request.

In some aspects, a non-transitory computer-readable medium storing a set of instructions for wireless communication includes one or more instructions that, when executed by one or more processors of a UE, cause the UE to: transmit a request to use a preferred number of TCI states for communications with one or more base stations; and receive an indication to use a number of TCI states based at least in part on the request.

In some aspects, a non-transitory computer-readable medium storing a set of instructions for wireless communication includes one or more instructions that, when executed by one or more processors of a base station, cause the base station to: receive, from a UE, a request to use a preferred number of TCI states; and transmit an indication to use a number of TCI states based at least in part on the request.

In some aspects, an apparatus for wireless communication includes means for transmitting a request to use a preferred number of TCI states for communications with one or more base stations; and means for receiving an indication to use a number of TCI states based at least in part on the request.

In some aspects, an apparatus for wireless communication includes means for receiving, from a UE, a request to use a preferred number of TCI states; and means for transmitting an indication to use a number of TCI states based at least in part on the request.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
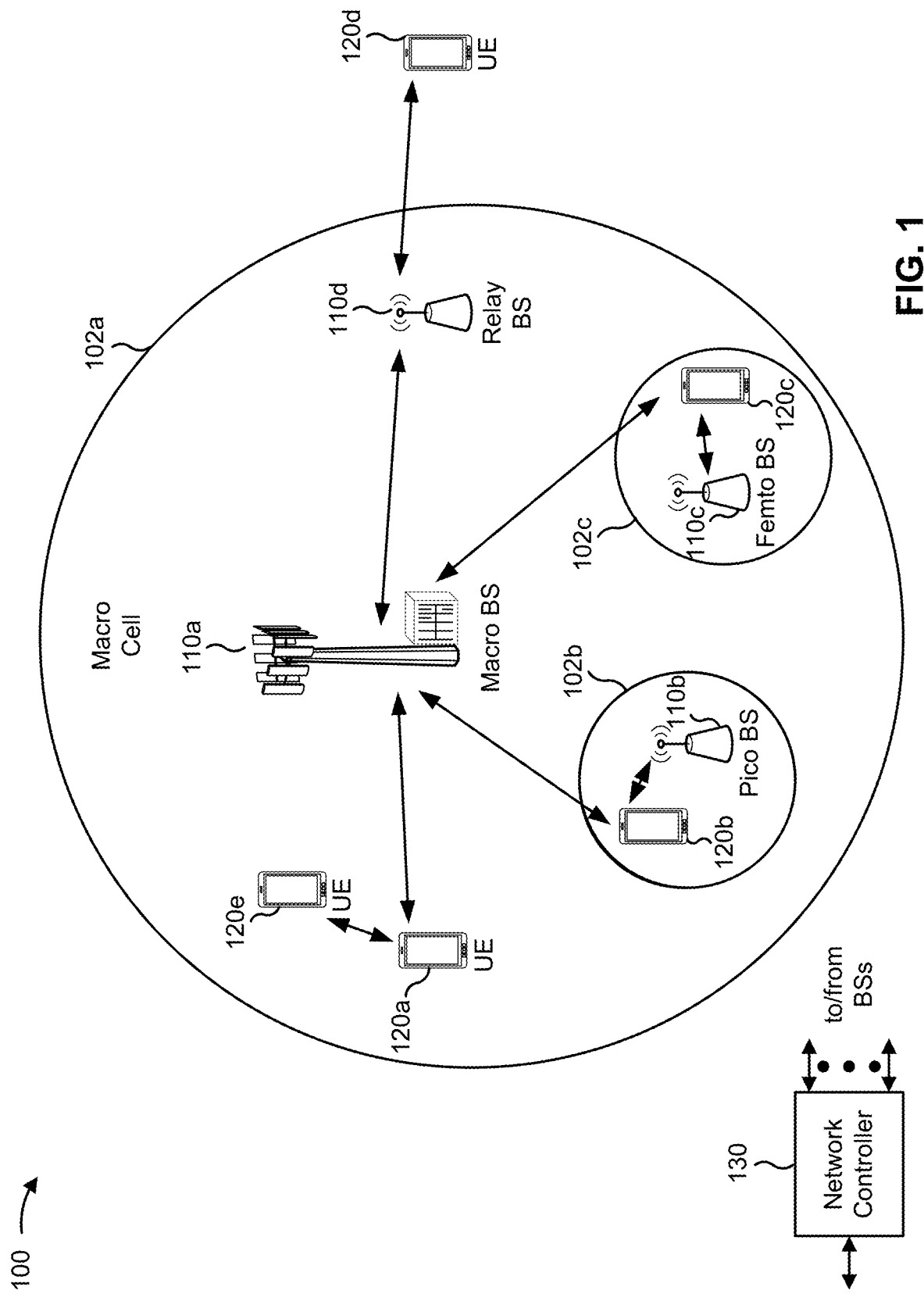
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
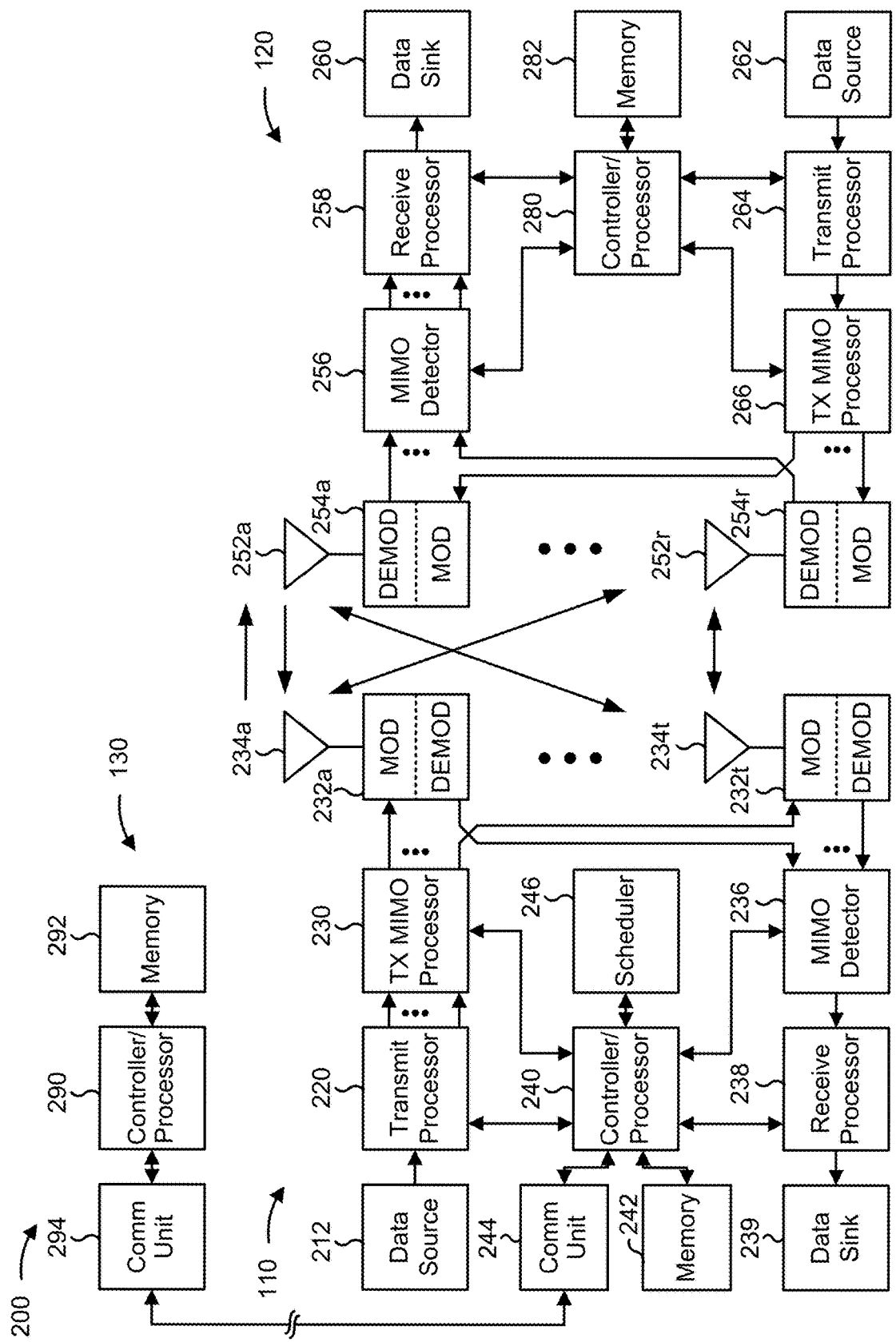
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s)

selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-8.

Controller/processor 240 of base station 110, controller/processor 280 of UE 120, and/or any other component(s) of FIG. 2 may perform one or more techniques associated with UE requests for a number of TCI states, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, UE 120 may include means for determining a preferred number of TCI states for communications with one or more base stations, and/or means for transmitting a request to use the preferred number of TCI states for the communications with the one or more base stations. In some aspects, UE 120 may include means for transmitting a request to use a preferred number of transmission configuration indicator (TCI) states for communications with one or more base stations; and/or means for receiving an indication to use a number of TCI states based at least in part on the request. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from a UE, a request to use a preferred number of TCI states; and/or means for determining, based at least in part on the request, a number of TCI states to use for communications with the UE. In some aspects, base station 110 may include means for receiving a request to use a preferred number of TCI states; and/or transmitting an indication to use a number of TCI states based at least in part on the request. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
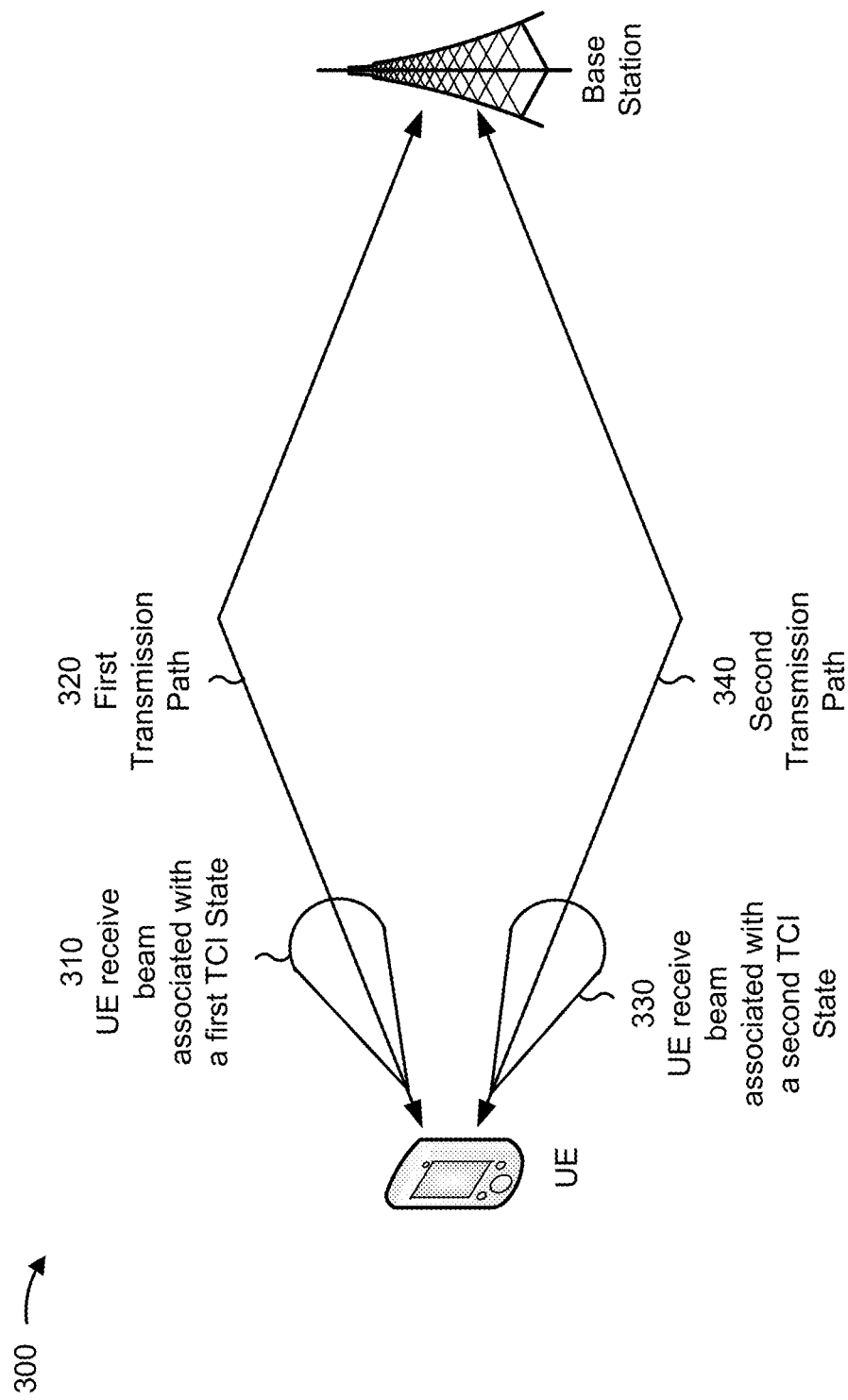
FIG. 3 is a diagram illustrating an example of communicating using one or more TCI states, in accordance with the present disclosure.

FIG. 3 is a diagram illustrating an example 300 of communicating using one or more TCI states, in accordance with the present disclosure. As shown in FIG. 3, a UE and a base station may communicate using the one or more TCI states. The UE and the base station may communicate via uplink and/or downlink transmissions as part of a wireless network.

As shown by reference number 310, the UE may be configured to communicate using a UE receive beam and/or UE transmit beam associated with a first TCI state. In some examples, the UE may be configured to receive downlink communications using a UE receive beam and/or UE transmit beam associated with a first TCI state and to transmit uplink communications using a corresponding beam of a corresponding first spatial relation. The UE receive beam and/or UE transmit beam associated with the first TCI state and the corresponding beam of the corresponding first spatial relation may have beam reciprocity.

As shown by reference number 320, the UE and the base station may communicate via a first transmission path. The first transmission path may be associated with the UE receive beam and/or UE transmit beam associated with the first TCI state. The first transmission path and/or the first TCI state may be associated with a first RSRP, a first RSSI, a first RSRQ, a first CQI, and/or the like.

As shown by reference number 330, the UE may be configured to communicate using a UE receive beam and/or UE transmit beam associated with a second TCI state (e.g., in addition to, or in the alternative to, the UE receive beam and/or UE transmit beam associated with the second TCI state). In some examples, the UE may be configured to receive downlink communications using a UE receive beam and/or UE transmit beam associated with a second TCI state and to transmit uplink communications using a corresponding beam of a corresponding second spatial relation. The UE receive beam and/or UE transmit beam associated with the second TCI state and the corresponding beam of the corresponding second spatial relation may have beam reciprocity.

As shown by reference number 340, the UE and the base station may communicate via a second transmission path. The second transmission path may be associated with the UE receive beam and/or UE transmit beam associated with the second TCI state. The second transmission path and/or the second TCI state may be associated with a second RSRP, a second RSSI, a second RSRQ, a second CQI, and/or the like.

The UE may be configured to report one or more of an RSRP, an RSSI, an RSRQ, a CQI, and/or the like for multiple TCI states. The base station may determine which of the multiple TCI states are to be used for communications between the base station and the UE. In some examples, the base station may determine that a set (e.g., of one or more) of the multiple TCI states are to be used for downlink transmissions and set of spatial relations are to be used for downlink transmissions. In some examples, the base station may determine that a set of the multiple TCI states are to be used for downlink transmissions and a corresponding set of multiple spatial relations (e.g., having a same number, having reciprocity, and/or the like) are to be used for uplink transmissions. In some examples, a number of TCI states of the set of the multiple TCI states is different from a number of spatial relations of the set of spatial relations to be used for uplink transmissions. In some examples, one or more directions associated with the set of the multiple TCI states is different (e.g., associated with a different, non-reciprocal transmission path) than one or more directions associated with the set of spatial relations.

The base station may determine a number of the multiple TCI states to use for communications between the UE and the base station. In some examples, the base station may determine to use a relatively high number of TCI states (e.g., two or more TCI states), which may increase robustness, lower throughput, and increase power usage by the UE. In some examples, determining to use the relatively high number of TCI states may unnecessarily consume overhead and power of the UE, based at least in part on one or more metrics of the communications or a state of the UE.

The base station may determine to use a relatively low number of TCI states (e.g., one TCI state), which may lower robustness, increase throughput, and lower power usage by the UE. In some examples, determining to use the relatively low number of TCI states may increase an error rate of communications. This may cause the base station and/or the UE to consume computing, communication, and/or network resources to detect and recover from errors.

In some aspects described herein, a UE may determine a preferred number of TCI states (e.g., 1 or 2 states) for communications with a base station. The UE may determine the preferred number of TCI states based at least in part on one or more metrics associated with the communications and/or based at least in part on a state of the UE. In some aspects, the UE may determine the number of TCI states based at least in part on information about the underlying raw channel (e.g., angles of arrival and/or path gains for channel paths, among other examples). For example, if the UE infers that there are two strong channel paths with enough angular separation (e.g., to avoid inter-beam interference above a threshold amount), the UE may indicate to the base station a request to communicate using two TCI states. In some aspects, the UE may implement machine learning to generate a model for determining a number of TCI states to use for communications, with inputs including metrics associated with the communication and/or information about the underlying raw channel.

The UE may transmit, to the base station, a request to use the preferred number of TCI states for the communications. In some aspects, the UE may further indicate which TCI states (e.g., associated with a UE receive beam and/or a UE transmit beam) that the UE prefers for the communications. Based at least in part on providing the base station with a request to use the preferred number of TCI states, the base station may account for UE preferences when determining a number of TCI states to use for the communications. This may conserve computing, communication, network, and/or power resources that may otherwise have been used to communicate via a number of TCI states without accounting for UE preferences, as described herein.

Figure 4:
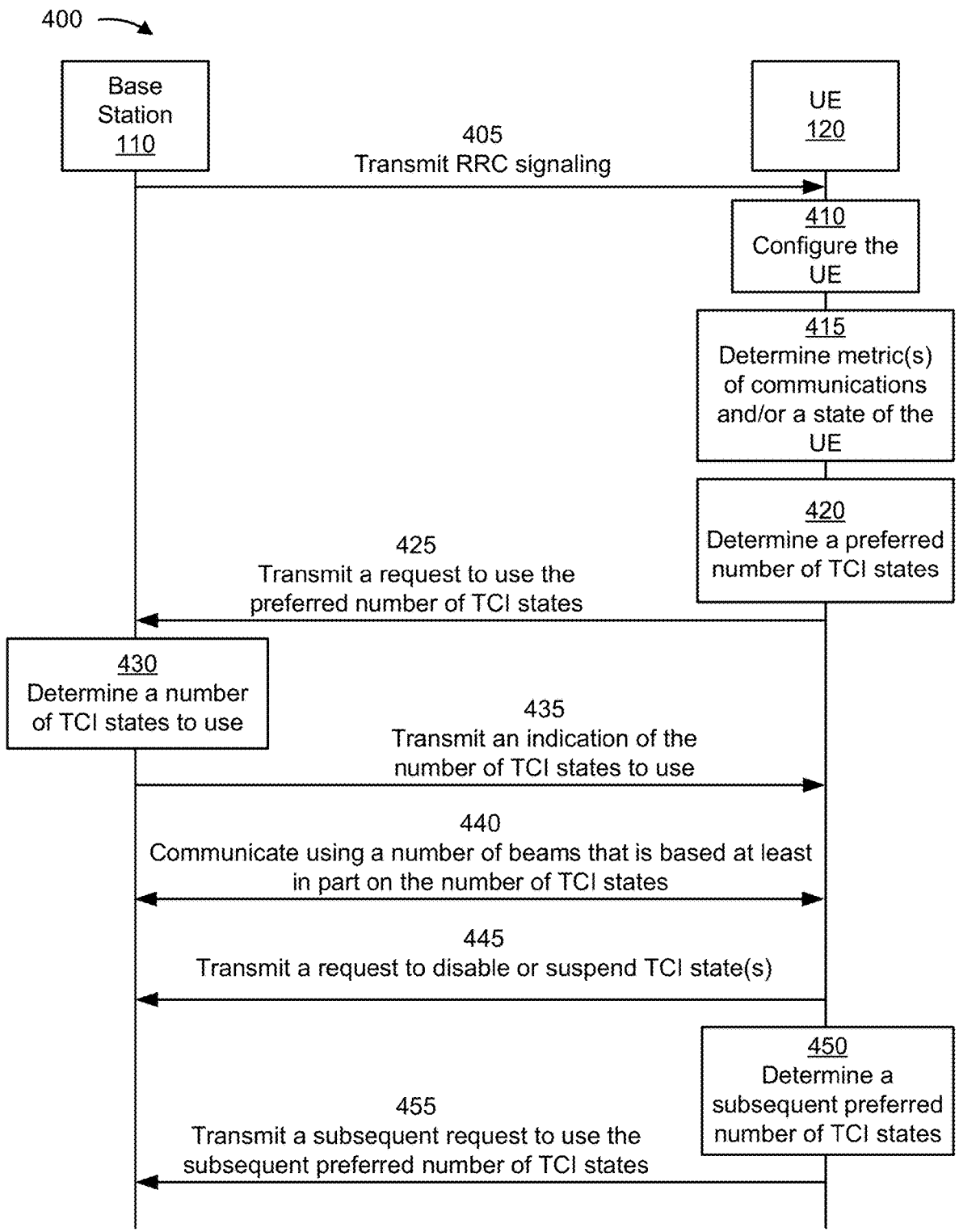
FIG. 4 is a diagram illustrating an example of UE requests for a number of TCI states, in accordance with the present disclosure.

FIG. 4 is a diagram illustrating an example 400 of UE requests for a number of TCI states, in accordance with the present disclosure. As shown, a UE (e.g., UE 120) and a base station (e.g., base station 110) may communicate using one or more of downlink transmissions and uplink transmissions. In some aspects, the base station and the UE may be part of a wireless network (e.g., the wireless network 100).

As shown in FIG. 4, and by reference number 410, the base station may transmit radio resource control (RRC) signaling to configure the UE to determine a preferred number of TCI states for communications with one or more base stations. In some aspects, the RRC signaling may indicate that the UE is to use one or more metrics associated with the communications, a state of the UE, and/or the like to determine the preferred number of TCI states for the communications. In some aspects, the RRC signaling may indicate a message type (e.g., medium access control control elements (MAC CEs), physical uplink control channel (PUCCH) communications, and/or the like) to use for transmitting the request, a format for transmitting the request, and/or the like.

As shown by reference number 410, the UE may configure the UE to determine a preferred number of TCI states for communications with one or more base stations, transmit a request to use the preferred number of TCI states for the communications, and/or the like (e.g., based at least in part on the RRC signaling). For example, the UE may be configured to determine the preferred number of TCI states based at least in part on one or more metrics associated with the communications, a state of the UE, and/or the like. The UE may be configured to transmit a request to use the preferred number of TCI states using one or more MAC CEs, a PUCCH communication, and/or the like.

As shown by reference number 415, the UE may determine the one or more metrics of the communications and/or the state of the UE. In some aspects, the UE may determine the preferred number of TCI states for the communications for new communications (e.g., before or near a beginning of a set of communications) or for ongoing communications (e.g., while actively transmitting or receiving a set of communications).

In some aspects, the one or more metrics include a robustness metric, a throughput metric, and/or the like. In some aspects, the UE may determine a priority of the one or more metrics based at least in part on a type of the communications. For example, if the type of communications is associated with a relatively high reliability requirement (e.g., ultra reliable and low latency communication (URLLC)), the UE may determine that robustness has a relatively high priority. If the type of communications is associated with a relatively high throughput requirement (e.g., live streaming video-based communications, live game-based communications, and/or the like), the UE may determine that throughput has a relatively high priority.

In some aspects, the UE may determine the state of the UE including one or more metrics associated with the state of the UE. In some aspects, the one or more metrics associated with the state of the UE may include a mobility metric of the UE (e.g., an indication of a speed and/or velocity of the UE), a power state of the UE (e.g., a power state that is based at least in part on a battery level being within a range of battery levels), a temperature of the UE (e.g., a temperature state of the UE that is based at least in part on a temperature being within a range of temperatures), an indicated preference for the UE (e.g., a setting of the UE as indicated by a user, as activated by the UE, and/or the like), and/or the like. For example, the UE may be in a state that includes a low power mode (e.g., based at least in part on a battery level, a setting indicated by user input, and/or the like) in which the UE may prioritize conservation of power resources.

As shown by reference number 420, the UE may determine the preferred number of TCI states for the communications with the one or more base stations. In some aspects, the UE may determine an identification of one or more TCI states to recommend to the one or more base stations. In some aspects, the UE may determine a number of TCI states for downlink communications from the one or more base stations, a number of spatial relations for uplink communications to the one or more base stations, or a number of TCI states for downlink communications from the one or more base stations and spatial relations for uplink communications to the one or more base stations.

The UE may determine the preferred number of TCI states based at least in part on the one or more metrics of the communications, the state of the UE, and/or the like. In some aspects, the UE may determine that the preferred number of TCI states is relatively low (e.g., one TCI state) based at least in part on the one or more metrics including a throughput metric that satisfies a first throughput threshold (e.g., being greater than, or greater than or equal to, the first throughput threshold), a robustness metric that satisfies a first robustness threshold (e.g., being less than, or less than or equal to, the first robustness threshold), and/or the like.

In some aspects, the UE may determine that the preferred number of TCI states is relatively high (e.g., two or more TCI states) based at least in part on the one or more metrics including a throughput metric that satisfies a second throughput threshold (e.g., being less than, or less than or equal to, the second throughput threshold), a robustness metric that satisfies a second robustness threshold (e.g., being greater than, or greater than or equal to, the second robustness threshold), and/or the like. In some aspects, the first robustness threshold and the second robustness threshold may be the same. In some aspects, the first throughput threshold and the second throughput threshold may be the same.

In some aspects, the UE may determine the preferred number of TCI states based at least in part on the one or more metrics associated with the state of the UE. For example, based at least in part on the state of the UE including a low power mode, the UE may prefer to communicate via a relatively low number of TCI states (e.g., one TCI state).

As shown by reference number 425 the UE may transmit a request to use the preferred number of TCI states for communication with one or more base stations. In some aspects, the preferred number of TCI states may be associated with simultaneous transmission and/or reception using multiple beams (e.g., having different directions). In some aspects, the UE may transmit the request via a PUCCH communication, one or more MAC CEs, and/or the like. In some aspects, the UE may transmit the request in response to receiving a prompt from the base station indicating that the base station requests the preferred number of TCI states from the UE. In some aspects, the request may include an identification of one or more TCI states for the communications with the one or more base stations.

As shown by reference number 430, the base station may determine a number of TCI states to use. For example, the base station may determine the number of TCI states based at least in part on the request to use the preferred number of TCI states received from the UE. The base station may determine whether to comply with the request from the UE based at least in part on cell-specific metrics, beam-specific metrics, and/or the like. For example, if the request indicates that the UE prefers to communicate via a relatively high number of TCI states, the base station may determine whether communicating via the relatively high number of TCI states may cause interference, disruption, and/or the like for communications with other UEs.

As shown by reference number 435, the base station may transmit an indication of the number of TCI states to use for the communications with the UE. In some aspects, the indication may include a confirmation that the request is granted, an explicit indication of the number of TCI states to use, or an implicit indication of the number of TCI states to use (e.g., included in a resource grant, a semi-persistent scheduling activation message, and/or the like).

As shown by reference number 440, the UE and the base station may communicate using a number of beams that is based at least in part on the number of TCI states. In some aspects, the UE may configure one or more components of the UE to communicate using a number of spatial relations, spatial filters, antenna groups, transmit chains, and/or receive chains based at least in part on the number of TCI states.

As shown by reference number 445, the UE may transmit a request to disable or suspend one or more TCI states. For example, the UE may transmit a request to disable or suspend the one or more TCI states to reduce a number of TCI states for subsequent communications with the one or more base stations. The UE may transmit the request based at least in part on a change in a communication type for the subsequent communications, a change in a state of the UE, and/or the like. In some aspects, the request may be temporary (e.g., with an expiration based at least in part on a time period, and indication from the UE, and/or the like). In some aspects, the UE may transmit the request to disable or suspend the one or more TCI states via a PUCCH communication, one or more MAC CEs, and/or the like.

As shown by reference number 450, the UE may determine a subsequent preferred number of TCI states for subsequent communications with the one or more base stations. In some aspects, the UE may determine the subsequent preferred number of TCI states for the subsequent communications based at least in part on completion of the communications (e.g., exiting a video feed, closing an application, and/or the like). In some aspects, the UE may determine the subsequent preferred number of TCI states for the subsequent communications based at least in part on initiating a new communication type (e.g., initiating a video feed, opening an application, and/or the like). In some aspects, the UE may determine the subsequent preferred number of TCI states for the subsequent communications based at least in part on a change in the state of the UE.

As show by reference number 455, the UE may transmit a subsequent request to use the subsequent preferred number of TCI states for the subsequent communications with the one or more base stations. In some aspects, the UE may transmit the request using a PUCCH communication, one or more MAC CEs, and/or the like.

By the UE transmitting the request to use the preferred number of TCI states, the base station may account for UE preferences when determining the number of TCI states to use for the communications between the UE and the base station. This may conserve computing, communication, network, and/or power resources that may otherwise be consumed by the base station determining the number of TCI states to use without input from the UE.

As indicated above, FIG. 4 is provided as an example. Other examples may differ from what is described with respect to FIG. 4.

Figure 5:
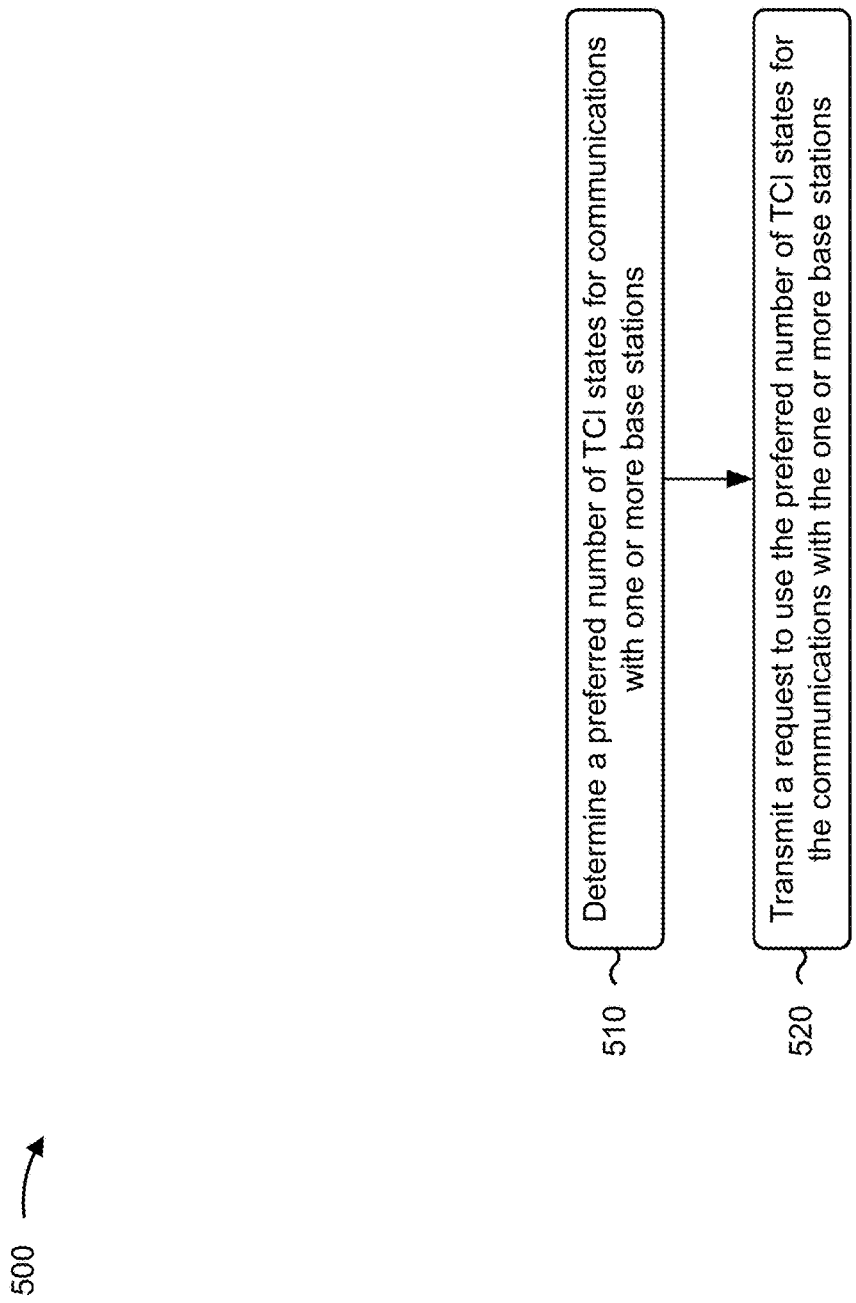
FIG. 5 is a diagram illustrating an example process performed, for example, by a UE in accordance with the present disclosure.

FIG. 5 is a diagram illustrating an example process 500 performed, for example, by a UE, in accordance with the present disclosure. Example process 500 is an example where the UE (e.g., UE 110 and/or the like) performs operations associated with UE requests for a number of TCI states.

As shown in FIG. 5, in some aspects, process 500 may include determining a preferred number of TCI states for communications with one or more base stations (block 510). For example, the UE (e.g., using controller/processor 280 and/or the like) may determine a preferred number of TCI states for communications with one or more base stations, as described above.

As further shown in FIG. 5, in some aspects, process 500 may include transmitting a request to use the preferred number of TCI states for the communications with the one or more base stations (block 520). For example, the UE (e.g., using controller/processor 280, transmit processor 264, TX MIMO processor 266, MOD 254, antenna 252, and/or the like) may transmit a request to use the preferred number of TCI states for the communications with the one or more base stations, as described above.

Process 500 may include additional aspects, such as any single aspect or any combination of aspects described below and/or in connection with one or more other processes described elsewhere herein.

In a first aspect, the preferred number of TCI states is based at least in part on one or more metrics associated with the communications with the one or more base stations.

In a second aspect, alone or in combination with the first aspect, the one or more metrics include one or more of a robustness metric or a throughput metric.

In a third aspect, alone or in combination with one or more of the first and second aspects, determining the preferred number of TCI states for communications with the one or more base stations includes one or more of: determining that the preferred number of TCI states is one TCI state based at least in part on the one or more metrics including a throughput metric that satisfies a first throughput threshold, determining that the preferred number of TCI states is one TCI state based at least in part on the one or more metrics including a robustness metric that satisfies a first robustness threshold, determining that the preferred number of TCI states is two or more TCI states based at least in part on the one or more metrics including a throughput metric that satisfies a second throughput threshold, or determining that the preferred number of TCI states is two or more TCI states based at least in part on the one or more metrics including a robustness metric that satisfies a second robustness threshold.

In a fourth aspect, alone or in combination with one or more of the first through third aspects, the preferred number of TCI states is based at least in part on one or more metrics associated with a state of the UE.

In a fifth aspect, alone or in combination with one or more of the first through fourth aspects, the state of the UE is associated with one or more of a mobility metric of the UE, a power state of the UE, a temperature of the UE, or an indicated preference for the UE.

In a sixth aspect, alone or in combination with one or more of the first through fifth aspects, transmitting the request to use the preferred number of TCI states for the communications with the one or more base stations includes transmitting the request via one or more of a PUCCH communication or a MAC CE.

In a seventh aspect, alone or in combination with one or more of the first through sixth aspects, the request includes an identification of one or more TCI states for the communications with the one or more base stations.

In an eighth aspect, alone or in combination with one or more of the first through seventh aspects, process 500 includes determining a subsequent preferred number of TCI states for subsequent communications with the one or more base stations and transmitting a subsequent request to use the subsequent preferred number of TCI states for the subsequent communications with the one or more base stations.

In a ninth aspect, alone or in combination with one or more of the first through eighth aspects, transmitting the subsequent request to use the subsequent preferred number of TCI states for the subsequent communications with the one or more base stations includes transmitting the subsequent request via one or more of a PUCCH communication or a MAC CE.

In a tenth aspect, alone or in combination with one or more of the first through ninth aspects, process 500 includes transmitting a request to disable or suspend one or more TCI states to reduce a number of TCI states for subsequent communications with the one or more base stations.

In an eleventh aspect, alone or in combination with one or more of the first through tenth aspects, transmitting the request to disable or suspend the one or more TCI states includes transmitting the request to disable or suspend the one or more TCI states via one or more of a PUCCH communication or a MAC CE.

In a twelfth aspect, alone or in combination with one or more of the first through eleventh aspects, the preferred number of TCI states for communicating with the one or more base stations is associated with a number of TCI states for downlink communications from the one or more base stations, a number of spatial relations for uplink communications to the one or more base stations, or a number of TCI states for downlink communications from the one or more base stations and uplink communications to the one or more base stations.

In a thirteenth aspect, alone or in combination with one or more of the first through eleventh aspects, process 500 includes receiving an indication to use a number of TCI states based at least in part on the request.

In a fourteenth aspect, alone or in combination with the twelfth aspect, process 500 includes communicating, with the one or more base stations, using a number of beams that is based at least in part on the number of TCI states.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
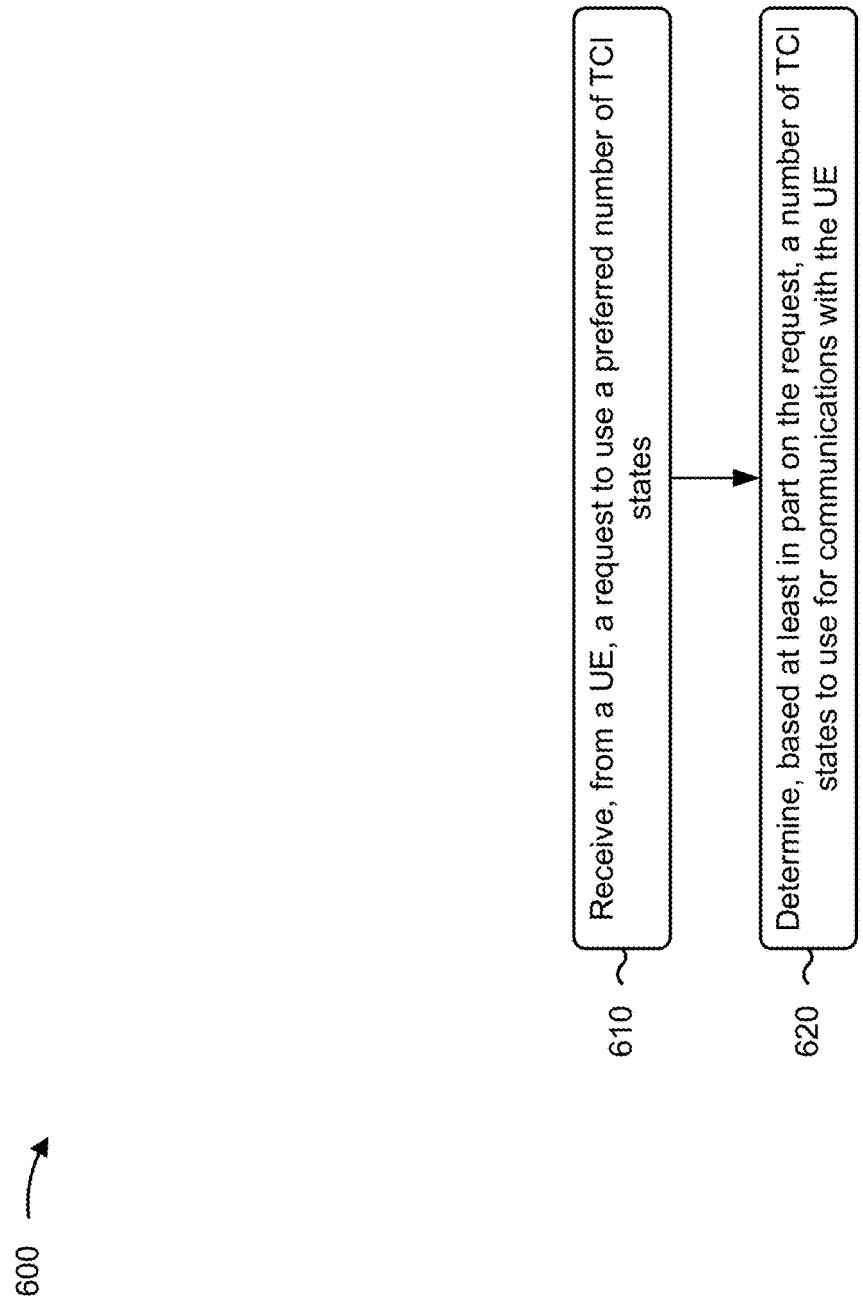
FIG. 6 is a diagram illustrating an example process performed, for example, by a base station, in accordance with the present disclosure.

FIG. 6 is a diagram illustrating an example process 600 performed, for example, by a base station, in accordance with the present disclosure. Example process 600 is an example where the base station (e.g., base station 110 and/or the like) performs operations associated with UE requests for a number of TCI states.

As shown in FIG. 6, in some aspects, process 600 may include receiving, from a UE, a request to use a preferred number of TCI states (block 610). For example, the base station (e.g., using receive processor 238, controller/processor 240, memory 242, and/or the like) may receive, from a UE, a request to use a preferred number of TCI states, as described above.

As further shown in FIG. 6, in some aspects, process 600 may include determining, based at least in part on the request, a number of TCI states to use for communications with the UE (block 620). For example, the base station (e.g., using transmit processor 220, receive processor 238, controller/processor 240, memory 242, and/or the like) may determine, based at least in part on the request, a number of TCI states to use for communications with the UE, as described above.

Process 600 may include additional aspects, such as any single aspect or any combination of aspects described below and/or in connection with one or more other processes described elsewhere herein.

In a first aspect, the preferred number of TCI states is based at least in part on one or more metrics associated with the communications.

In a second aspect, alone or in combination with the first aspect, the one or more metrics include one or more of a robustness metric or a throughput metric.

In a third aspect, alone or in combination with one or more of the first and second aspects, the preferred number of TCI states is based at least in part on one or more metrics associated with a state of the UE.

In a fourth aspect, alone or in combination with one or more of the first through third aspects, the state of the UE is associated with one or more of a mobility metric of the UE, a power state of the UE, a temperature of the UE, or an indicated preference for the UE.

In a fifth aspect, alone or in combination with one or more of the first through fourth aspects, receiving the request to use the preferred number of TCI states for the communications includes receiving the request via one or more of a PUCCH communication or a MAC CE.

In a sixth aspect, alone or in combination with one or more of the first through fifth aspects, the request includes an identification of one or more TCI states for the communications.

In a seventh aspect, alone or in combination with one or more of the first through sixth aspects, process 600 includes receiving a subsequent request to use a subsequent preferred number of TCI states for subsequent communications.

In an eighth aspect, alone or in combination with one or more of the first through seventh aspects, receiving the subsequent request to use the subsequent preferred number of TCI states for the subsequent communications includes receiving the subsequent request via one or more of a PUCCH communication or a MAC CE.

In a ninth aspect, alone or in combination with one or more of the first through eighth aspects, process 600 includes receiving a request to disable or suspend one or more TCI states to reduce a number of TCI states for subsequent communications.

In a tenth aspect, alone or in combination with one or more of the first through ninth aspects, receiving the request to disable or suspend the one or more TCI states includes receiving the request to disable or suspend the one or more TCI states via one or more of a PUCCH communication or a MAC CE.

In an eleventh aspect, alone or in combination with one or more of the first through tenth aspects, the preferred number of TCI states is associated with a number of TCI states for downlink communications to the UE, a number of spatial relations for uplink communications from the UE, or a number of TCI states for downlink communications to the UE and uplink communications from the UE.

In a twelfth aspect, alone or in combination with one or more of the first through eleventh aspects, process 600 includes transmitting an indication to use a number of TCI states based at least in part on the request.

In a thirteenth aspect, alone or in combination with the twelfth aspect, process 600 includes communicating, with the UE, using a number of beams that is based at least in part on the number of TCI states.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
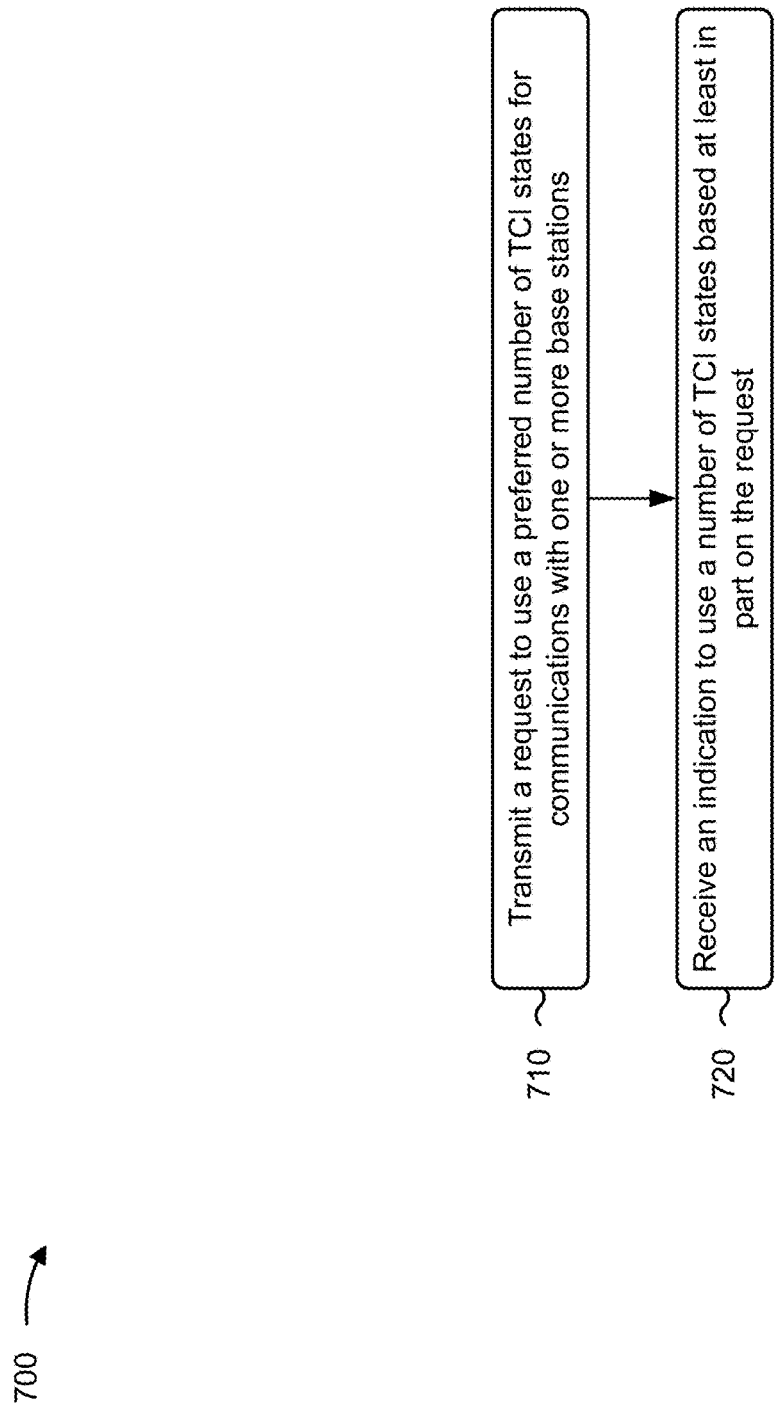
FIG. 7 is a diagram illustrating an example process performed, for example, by a UE in accordance with the present disclosure.

FIG. 7 is a diagram illustrating an example process 700 performed, for example, by a UE, in accordance with the present disclosure. Example process 700 is an example where the UE (e.g., UE 120) performs operations associated with UE requests for a number of TCI states.

As shown in FIG. 7, in some aspects, process 700 may include transmitting a request to use a preferred number of TCI states for communications with one or more base stations (block 710). For example, the UE (e.g., using controller/processor 280, transmit processor 264, TX MIMO processor 266, MOD 254, antenna 252, and/or the like) may transmit a request to use a preferred number of TCI states for communications with one or more base stations, as described above.

As further shown in FIG. 7, in some aspects, process 700 may include receiving an indication to use a number of TCI states based at least in part on the request (block 720). For example, the UE (e.g., using antenna 252, DEMOD 254, MIMO detector 256, receive processor 258, controller/ processor 280, and/or the like) may receive an indication to use a number of TCI states based at least in part on the request, as described above.

Process 700 may include additional aspects, such as any single aspect or any combination of aspects described below and/or in connection with one or more other processes described elsewhere herein.

In a first aspect, the preferred number of TCI states is based at least in part on one or more metrics associated with the communications with the one or more base stations.

In a second aspect, alone or in combination with the first aspect, the one or more metrics include one or more of a robustness metric, or a throughput metric.

In a third aspect, alone or in combination with one or more of the first and second aspects, process 700 includes determining that the preferred number of TCI states is one TCI state based at least in part on the one or more metrics including a throughput metric that satisfies a first throughput threshold, determining that the preferred number of TCI states is one TCI state based at least in part on the one or more metrics including a robustness metric that satisfies a first robustness threshold, determining that the preferred number of TCI states is two or more TCI states based at least in part on the one or more metrics including a throughput metric that satisfies a second throughput threshold, or determining that the preferred number of TCI states is two or more TCI states based at least in part on the one or more metrics including a robustness metric that satisfies a second robustness threshold.

In a fourth aspect, alone or in combination with one or more of the first through third aspects, the preferred number of TCI states is based at least in part on one or more metrics associated with a state of the UE.

In a fifth aspect, alone or in combination with one or more of the first through fourth aspects, the state of the UE is associated with one or more of a mobility metric of the UE, a power state of the UE, a temperature of the UE, or an indicated preference for the UE.

In a sixth aspect, alone or in combination with one or more of the first through fifth aspects, transmitting the request to use the preferred number of TCI states for the communications with the one or more base stations comprises transmitting the request via one or more of a PUCCH communication or a MAC CE.

In a seventh aspect, alone or in combination with one or more of the first through sixth aspects, the request includes an identification of one or more TCI states for the communications with the one or more base stations.

In an eighth aspect, alone or in combination with one or more of the first through seventh aspects, process 700 includes transmitting a subsequent request to use the subsequent preferred number of TCI states for the subsequent communications with the one or more base stations.

In a ninth aspect, alone or in combination with one or more of the first through eighth aspects, process 700 includes transmitting a request to disable or suspend one or more TCI states to reduce a number of TCI states for subsequent communications with the one or more base stations.

In a tenth aspect, alone or in combination with one or more of the first through ninth aspects, transmitting the request to disable or suspend the one or more TCI states includes transmitting the request to disable or suspend the one or more TCI states via one or more of a PUCCH communication or a MAC CE.

In an eleventh aspect, alone or in combination with one or more of the first through tenth aspects, the preferred number of TCI states for communicating with the one or more base stations is associated with a number of TCI states for downlink communications from the one or more base stations, a number of spatial relations for uplink communications to the one or more base stations, or a number of TCI states for downlink communications from the one or more base stations and spatial relations for uplink communications to the one or more base stations.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
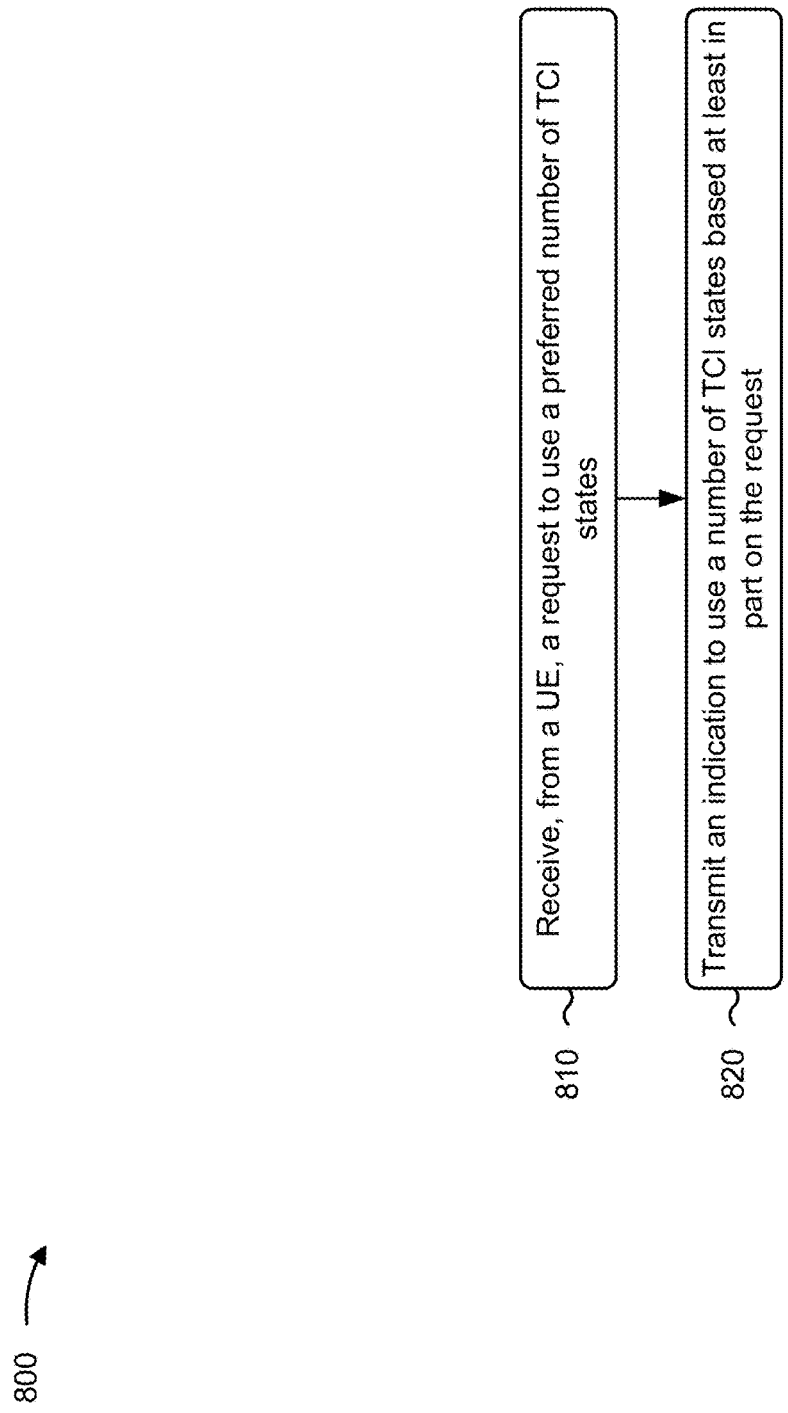
FIG. 8 is a diagram illustrating an example process performed, for example, by a base station, in accordance with the present disclosure.

FIG. 8 is a diagram illustrating an example process 800 performed, for example, by a base station, in accordance with the present disclosure. Example process 800 is an example where the base station (e.g., base station 110) performs operations associated with UE requests for a number of TCI states.

As shown in FIG. 8, in some aspects, process 800 may include receiving, from a UE, a request to use a preferred number of TCI states (block 810). For example, the base station (e.g., using antenna 234, DEMOD 232, MIMO detector 236, receive processor 238, controller/processor 240, and/or the like) may receive, from a UE, a request to use a preferred number of TCI states, as described above.

As further shown in FIG. 8, in some aspects, process 800 may include transmitting an indication to use a number of TCI states based at least in part on the request (block 820). For example, the base station (e.g., using controller/processor 240, transmit processor 220, TX MIMO processor 230, MOD 232, antenna 234, and/or the like) may transmit an indication to use a number of TCI states based at least in part on the request, as described above.

Process 800 may include additional aspects, such as any single aspect or any combination of aspects described below and/or in connection with one or more other processes described elsewhere herein.

In a first aspect, process 800 includes communicating, with the one or more base stations, using a number of beams that is based at least in part on the number of TCI states.

In a second aspect, alone or in combination with the first aspect, the preferred number of TCI states is based at least in part on one or more metrics associated with the communications.

In a third aspect, alone or in combination with one or more of the first and second aspects, the one or more metrics include one or more of a robustness metric, or a throughput metric.

In a fourth aspect, alone or in combination with one or more of the first through third aspects, the preferred number of TCI states is based at least in part on one or more metrics associated with a state of the UE.

In a fifth aspect, alone or in combination with one or more of the first through fourth aspects, the state of the UE is associated with one or more of a mobility metric of the UE, a power state of the UE, a temperature of the UE, or an indicated preference for the UE.

In a sixth aspect, alone or in combination with one or more of the first through fifth aspects, receiving the request to use the preferred number of TCI states for the communications comprises receiving the request via one or more of a PUCCH communication or a MAC CE.

In a seventh aspect, alone or in combination with one or more of the first through sixth aspects, the request includes an identification of one or more TCI states for the communications.

In an eighth aspect, alone or in combination with one or more of the first through seventh aspects, process 800 includes receiving a subsequent request to use a subsequent preferred number of TCI states for subsequent communications.

In a ninth aspect, alone or in combination with one or more of the first through eighth aspects, process 800 includes receiving a request to disable or suspend one or more TCI states to reduce a number of TCI states for subsequent communications.

In a tenth aspect, alone or in combination with one or more of the first through ninth aspects, receiving the request to disable or suspend the one or more TCI states includes receiving the request to disable or suspend the one or more TCI states via one or more of a PUCCH communication or a MAC CE.

In an eleventh aspect, alone or in combination with one or more of the first through tenth aspects, the preferred number of TCI states is associated with a number of TCI states for downlink communications to the UE, a number of spatial relations for uplink communications from the UE, or a number of TCI states for downlink communications to the UE and spatial relations for uplink communications from the UE.

In a twelfth aspect, alone or in combination with one or more of the first through eleventh aspects, process 800 includes communicating using a number of beams that is based at least in part on the number of TCI states.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method of wireless communications performed by a user equipment (UE), comprising: transmitting a request to use a preferred number of transmission configuration indicator (TCI) states for communications with one or more base stations; and receiving an indication to use a number of TCI states based at least in part on the request.

Aspect 2: The method of Aspect 1, wherein the preferred number of TCI states is based at least in part on one or more metrics associated with the communications with the one or more base stations.

Aspect 3: The method of Aspect 2, wherein the one or more metrics include one or more of: a robustness metric, or a throughput metric.

Aspect 4: The method of Aspect 3, further comprising determining that the preferred number of TCI states is one TCI state based at least in part on the one or more metrics including a throughput metric that satisfies a first throughput threshold, determining that the preferred number of TCI states is one TCI state based at least in part on the one or more metrics including a robustness metric that satisfies a first robustness threshold, determining that the preferred number of TCI states is two or more TCI states based at least in part on the one or more metrics including a throughput metric that satisfies a second throughput threshold, or determining that the preferred number of TCI states is two or more TCI states based at least in part on the one or more metrics including a robustness metric that satisfies a second robustness threshold.

Aspect 5: The method of any of Aspects 1-4, wherein the preferred number of TCI states is based at least in part on one or more metrics associated with a state of the UE.

Aspect 6: The method of Aspect 5, wherein the state of the UE is associated with one or more of: a mobility metric of the UE, a power state of the UE, a temperature of the UE, or an indicated preference for the UE.

Aspect 7: The method of any of Aspects 1-6, wherein transmitting the request to use the preferred number of TCI states for the communications with the one or more base stations comprises: transmitting the request via one or more of a physical uplink control channel communication or a medium access control control element.

Aspect 8: The method of any of Aspects 1-7, wherein the request includes an identification of one or more TCI states for the communications with the one or more base stations.

Aspect 9: The method of any of Aspects 1-8, further comprising: determining a subsequent preferred number of TCI states for subsequent communications with the one or more base stations; and transmitting a subsequent request to use the subsequent preferred number of TCI states for the subsequent communications with the one or more base stations.

Aspect 10: The method of Aspect 9, wherein transmitting the subsequent request to use the subsequent preferred number of TCI states for the subsequent communications with the one or more base stations comprises: transmitting the subsequent request via one or more of a physical uplink control channel communication or a medium access control control element.

Aspect 11: The method of any of Aspects 1-10, further comprising: transmitting a request to disable or suspend one or more TCI states to reduce a number of TCI states for subsequent communications with the one or more base stations.

Aspect 12: The method of Aspect 11, wherein transmitting the request to disable or suspend the one or more TCI states includes: transmitting the request to disable or suspend the one or more TCI states via one or more of a physical uplink control channel communication or a medium access control control element.

Aspect 13: The method of any of Aspects 1-12, wherein the preferred number of TCI states for communicating with the one or more base stations is associated with: a number of TCI states for downlink communications from the one or more base stations, a number of spatial relations for uplink communications to the one or more base stations, or a number of TCI states for downlink communications from the one or more base stations and spatial relations for uplink communications to the one or more base stations.

Aspect 14: The method of any of Aspects 1-13, further comprising: communicating, with the one or more base stations, using a number of beams that is based at least in part on the number of TCI states.

Aspect 15: A method of wireless communications performed by a base station, comprising: receiving, from a user equipment (UE), a request to use a preferred number of transmission configuration indicator (TCI) states; and determining, based at least in part on the request, a number of TCI states to use for communications with the UE.

Aspect 16: The method of Aspect 15, wherein the preferred number of TCI states is based at least in part on one or more metrics associated with the communications.

Aspect 17: The method of Aspect 16, wherein the one or more metrics include one or more of: a robustness metric, or a throughput metric.

Aspect 18: The method of Aspect 17, wherein the preferred number of TCI states is based at least in part on one or more metrics associated with a state of the UE.

Aspect 19: The method of Aspect 18, wherein the state of the UE is associated with one or more of: a mobility metric of the UE, a power state of the UE, a temperature of the UE, or an indicated preference for the UE.

Aspect 20: The method of any of Aspects 15-19, wherein receiving the request to use the preferred number of TCI states for the communications comprises: receiving the request via one or more of a physical uplink control channel communication or a medium access control control element.

Aspect 21: The method of any of Aspects 15-20, wherein the request includes an identification of one or more TCI states for the communications.

Aspect 22: The method of any of Aspects 15-21, further comprising: receiving a subsequent request to use a subsequent preferred number of TCI states for subsequent communications.

Aspect 23: The method of Aspect 22, wherein receiving the subsequent request to use the subsequent preferred number of TCI states for the subsequent communications comprises: receiving the subsequent request via one or more of a physical uplink control channel communication or a medium access control control element.

Aspect 24: The method of any of Aspects 15-23, further comprising: receiving a request to disable or suspend one or more TCI states to reduce a number of TCI states for subsequent communications.

Aspect 25: The method of Aspect 24, wherein receiving the request to disable or suspend the one or more TCI states includes: receiving the request to disable or suspend the one or more TCI states via one or more of a physical uplink control channel communication or a medium access control control element.

Aspect 26: The method of any of Aspects 15-25, wherein the preferred number of TCI states is associated with: a number of TCI states for downlink communications to the UE, a number of spatial relations for uplink communications from the UE, or a number of TCI states for downlink communications to the UE and spatial relations for uplink communications from the UE.

Aspect 26: The method of any of Aspects 15-25, further comprising: communicating using a number of beams that is based at least in part on the number of TCI states.

Aspect 27: An apparatus for wireless communication at a device, comprising a processor; memory coupled with the processor; and instructions stored in the memory and executable by the processor to cause the apparatus to perform the method of one or more of Aspects 1-26.

Aspect 28: A device for wireless communication, comprising a memory and one or more processors coupled to the memory, the memory and the one or more processors configured to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors coupled to the memory, the one or more processors configured to cause the UE to:
      transmit, prior to a number of transmission configuration indicator (TCI) states being determined for performing communications with one or more base stations, a request to use a preferred number of TCI states for the communications with the one or more base stations, a determination of the preferred number of TCI states being based at least in part on an angular separation of a set of channel paths; and
      receive an indication to use the number of TCI states based at least in part on the request.

2. The UE of claim 1, wherein the preferred number of TCI states is based at least in part on one or more metrics associated with the communications with the one or more base stations.

3. The UE of claim 2, wherein the one or more metrics include one or more of:
   a robustness metric, or
   a throughput metric.

4. The UE of claim 3, wherein the preferred number of TCI states is one TCI state based at least in part on the one or more metrics including a throughput metric that satisfies a first throughput threshold or based at least in part on the one or more metrics including a robustness metric that satisfies a first robustness threshold, and the preferred number of TCI states is two or more TCI states based at least in part on the one or more metrics including a throughput metric that satisfies a second throughput threshold, or based at least in part on the one or more metrics including a robustness metric that satisfies a second robustness threshold.

5. The UE of claim 1, wherein the preferred number of TCI states is based at least in part on one or more metrics associated with a state of the UE.

6. The UE of claim 5, wherein the state of the UE is associated with one or more of:
   a mobility metric of the UE,
   a power state of the UE,
   a temperature of the UE, or
   an indicated preference for the UE.

7. The UE of claim 1, wherein the one or more processors, when transmitting the request to use the preferred number of TCI states for the communications with the one or more base stations, are configured to cause the UE to:
   transmit the request via one or more of a physical uplink control channel communication or a medium access control control element.

8. The UE of claim 1, wherein the request includes an identification of one or more TCI states for the communications with the one or more base stations.

9. The UE of claim 1, wherein the one or more processors are further configured to cause the UE to:
   transmit a subsequent request to use a subsequent preferred number of TCI states for subsequent communications with the one or more base stations.

10. The UE of claim 1, wherein the one or more processors are further configured to cause the UE to:
transmit a request to disable or suspend one or more TCI states to reduce a number of TCI states for subsequent communications with the one or more base stations.

11. The UE of claim 10, wherein the one or more processors, when transmitting the request to disable or suspend the one or more TCI states, are configured to cause the UE to:
transmit the request to disable or suspend the one or more TCI states via one or more of a physical uplink control channel communication or a medium access control control element.

12. The UE of claim 1, wherein the preferred number of TCI states for communicating with the one or more base stations is associated with:
a number of TCI states for downlink communications from the one or more base stations,
a number of spatial relations for uplink communications to the one or more base stations, or
a number of TCI states for downlink communications from the one or more base stations and spatial relations for uplink communications to the one or more base stations.

13. The UE of claim 10, wherein the preferred number of TCI states indicates a plurality of TCI states, and wherein the one or more processors are configured to cause the UE to:
communicate, with the one or more base stations, using a number of beams that is based at least in part on the number of TCI states.

14. A method of wireless communications performed by a user equipment (UE), comprising:
transmitting, prior to a number of transmission configuration indicator (TCI) states being determined for performing communications with one or more base stations, a request to use a preferred number of TCI states for the communications with the one or more base stations, a determination of the preferred number of TCI states being based at least in part on an angular separation of a set of channel paths; and
receiving an indication to use the number of TCI states based at least in part on the request.

15. The method of claim 14, wherein the preferred number of TCI states is based at least in part on one or more metrics associated with the communications with the one or more base stations.

16. The method of claim 15, wherein the one or more metrics include one or more of:
a robustness metric, or
a throughput metric.

17. The method of claim 16, further comprising:
determining that the preferred number of TCI states is one TCI state based at least in part on the one or more metrics including a throughput metric that satisfies a first throughput threshold,
determining that the preferred number of TCI states is one TCI state based at least in part on the one or more metrics including a robustness metric that satisfies a first robustness threshold,
determining that the preferred number of TCI states is two or more TCI states based at least in part on the one or more metrics including a throughput metric that satisfies a second throughput threshold, or
determining that the preferred number of TCI states is two or more TCI states based at least in part on the one or more metrics including a robustness metric that satisfies a second robustness threshold.

18. The method of claim 14, wherein the preferred number of TCI states is based at least in part on one or more metrics associated with a state of the UE.

19. The method of claim 18, wherein the state of the UE is associated with one or more of:
a mobility metric of the UE,
a power state of the UE,
a temperature of the UE, or
an indicated preference for the UE.

20. The method of claim 14, wherein transmitting the request to use the preferred number of TCI states for the communications with the one or more base stations comprises:
transmitting the request via one or more of a physical uplink control channel communication or a medium access control control element.

21. The method of claim 14, wherein the request includes an identification of one or more TCI states for the communications with the one or more base stations.

22. The method of claim 14, further comprising:
transmitting a subsequent request to use a subsequent preferred number of TCI states for subsequent communications with the one or more base stations.

23. The method of claim 14, further comprising:
transmitting a request to disable or suspend one or more TCI states to reduce a number of TCI states for subsequent communications with the one or more base stations.

24. The method of claim 23, wherein transmitting the request to disable or suspend the one or more TCI states includes:
transmitting the request to disable or suspend the one or more TCI states via one or more of a physical uplink control channel communication or a medium access control control element.

25. The method of claim 14, wherein the preferred number of TCI states for communicating with the one or more base stations is associated with:
a number of TCI states for downlink communications from the one or more base stations,
a number of spatial relations for uplink communications to the one or more base stations, or
a number of TCI states for downlink communications from the one or more base stations and spatial relations for uplink communications to the one or more base stations.

26. The method of claim 14, further comprising:
communicating, with the one or more base stations, using a number of beams that is based at least in part on the number of TCI states.

27. A non-transitory computer-readable medium storing a set of instructions for wireless communication, the set of instructions comprising:
one or more instructions that, when executed by one or more processors of a user equipment (UE), cause the UE to:
transmit, prior to a number of transmission configuration indicator (TCI) states being determined for performing communications with one or more base stations, a request to use a preferred number of TCI states for the communications with the one or more base stations, a determination of the preferred number of TCI states being based at least in part on an angular separation of a set of channel paths; and
receive an indication to use the number of TCI states based at least in part on the request.

28. The non-transitory computer-readable medium of claim 27, wherein the one or more instructions, that cause the UE to transmit the request to use the preferred number of TCI states for the communications with the one or more base stations, cause the UE to:
- transmit the request via one or more of a physical uplink control channel communication or a medium access control control element.

29. An apparatus for wireless communication, comprising:
- means for transmitting, prior to a number of transmission configuration indicator (TCI) states being determined for performing communications with one or more base stations, a request to use a preferred number of TCI states for the communications with the one or more base stations, a determination of the preferred number of TCI states being based at least in part on an angular separation of a set of channel paths; and
- means for receiving an indication to use the number of TCI states based at least in part on the request.

30. The apparatus of claim 29, wherein the means for transmitting the request to use the preferred number of TCI states for the communications with the one or more base stations comprises:
- means for transmitting the request via one or more of a physical uplink control channel communication or a medium access control control element.

* * * * *